United States Patent [19]
Kajita et al.

[11] Patent Number: 5,691,082
[45] Date of Patent: Nov. 25, 1997

[54] BETA-ALUMINA SOLID ELECTROLYTE AND PROCESS FOR PRODUCTION THEREOF

[75] Inventors: Masaharu Kajita, Tajimi; Takehiro Kajihara, Komaki; Takao Totoki, Nagoya, all of Japan

[73] Assignee: NGK Insulators, Ltd., Japan

[21] Appl. No.: 707,293

[22] Filed: Sep. 3, 1996

Related U.S. Application Data

[62] Division of Ser. No. 397,756, Mar. 2, 1995, Pat. No. 5,612,154.

[30] Foreign Application Priority Data

Mar. 29, 1994 [JP] Japan .................. 6-58972

[51] Int. Cl.$^6$ .................. H01M 6/18; C01F 7/00
[52] U.S. Cl. .................. 429/193; 423/119; 423/600; 501/120; 501/153
[58] Field of Search .................. 429/193, 191, 429/204, 33, 30; 501/118, 120, 153; 423/119, 600, 625; 264/DIG. 25

[56] References Cited

U.S. PATENT DOCUMENTS

| | | | |
|---|---|---|---|
| 4,083,919 | 4/1978 | Pearlman | 429/193 |
| 4,113,928 | 9/1978 | Virkar et al. | |
| 4,307,138 | 12/1981 | Powers et al. | 429/193 |
| 4,339,511 | 7/1982 | Morgan | 429/189 |
| 4,370,393 | 1/1983 | Watanabe et al. | 501/103 |
| 4,539,276 | 9/1985 | Harbach | 429/191 |
| 4,732,741 | 3/1988 | Duncan et al. | 423/119 |
| 5,188,994 | 2/1993 | Ichikawa et al. | 501/153 |
| 5,213,911 | 5/1993 | Bloom et al. | 429/33 |
| 5,510,210 | 4/1996 | Kim | 429/193 |

FOREIGN PATENT DOCUMENTS

| | | |
|---|---|---|
| 492334 | 7/1992 | European Pat. Off. . |
| 2917590 | 11/1980 | Germany . |
| 3-163763 | 7/1991 | Japan . |
| 3-174353 | 7/1991 | Japan . |
| 5-47412 | 2/1993 | Japan . |
| 2175582 | 12/1986 | United Kingdom . |

OTHER PUBLICATIONS

"Preparation of $\beta''$-Al$_2$O$_3$ Pressing Powders by Spray Drying", David W. Johnson et al., Bell Labs, Murray Hill, N.J., Ceramic Bulletin, vol. 58, No. 9 (1979), pp. 849–852 and 855. No month.

"Homogenization, Phase Formation, and Sintering of Spray-Dired $\beta''$-Al$_2$O$_3$", Eva M. Vogel et al., Bell Labs, Murray Hill, N.J., Ceramic Bulletin, vol. 60, No. 4 (1981), pp. 494–496 and 500. No month.

*Primary Examiner*—Anthony Skapars
*Attorney, Agent, or Firm*—Parkhurst, Wendel & Burr, L.L.P.

[57] ABSTRACT

A beta-alumina solid electrolyte for use in a sodium-sulfur battery is composed of beta-alumina crystals having a degree of orientation toward the C axis thereof, of 0.2–0.4 and an aspect ratio of 4.0 or less. The beta-alumina solid electrolyte is composed of the beta-alumina crystals having a degree of orientation toward the C axis thereof, of 0.2–0.4 and has such a particle distribution that the average particle diameter is 3 μm or less, the proportion of the particles having a particle diameter of 5 μm or less is 90% or more, and the maximum particle diameter is 300 μm or less. A process for producing a beta-alumina solid electrolyte using an alumina source material, a magnesium source material and a sodium source material, uses a magnesium-aluminum spinel as the magnesium source material and subjects all materials to mixing, granulation, molding and firing to obtain a beta-alumina solid electrolyte without subjecting the materials to calcination. The beta-alumina solid electrolyte has a low electrical resistance and a large strength to internal water pressure and exhibits excellent properties when used as a diaphragm for a sodium-sulfur battery.

4 Claims, 2 Drawing Sheets

BETA-ALUMINA SOLID ELECTROLYTE AND PROCESS FOR PRODUCTION THEREOF

This is a Division of application Ser. No. 08/397,756 filed Mar. 2, 1995, now U.S. Pat. No. 5,612,154.

BACKGROUND OF THE INVENTION

(1) Field of the Invention

The present invention relates to a beta-alumina solid electrolyte having excellent properties such as low electrical resistance, high strength and the like, as well as to a process for production thereof. More particularly, the present invention relates to a process for production of beta-alumina solid electrolyte, which can produce a beta-alumina solid electrolyte having excellent properties without subjecting the materials to calcination (calcination is conducted in conventional processes).

(2) Prior Art

Beta-Alumina solid electrolytes have a very high sodium ion conductivity, i.e. a low electrical resistance. Hence, attention is being paid to their use as a diaphragm for a sodium-sulfur battery, and the like.

Of the beta-alumina solid electrolytes, an MgO-stabilized beta-alumina solid electrolyte has conventionally been produced as follows. That is, the materials, i.e. MgO, a sodium compound and $\alpha$-$Al_2O_3$, are mixed at an appropriate ratio; the mixture is calcined to obtain beta-alumina; grinding is conducted; the ground material is then granulated, molded into a desired shape and fired to obtain a beta-alumina solid electrolyte.

The reason why the materials are calcined beforehand to obtain beta-alumina, is that when beta-alumina is produced by direct firing without conducting calcination, severe volume expansion in the phase transition from $\alpha$-$Al_2O_3$ to beta-alumina occurs, making it difficult to obtain a beta-alumina solid electrolyte of uniform quality and high strength.

In the conventional process, however, since the materials are calcined beforehand to obtain beta-alumina, the steps become complex and invite a high cost. Hence, it is strongly desired in production of a sodium-sulfur battery, and the like to shorten the total production steps and produce a beta-alumina solid electrolyte more efficiently.

Further, since the above-mentioned conventional process conducts preliminary calcination (to obtain beta-alumina), grinding, granulation, molding and firing, the crystals constituting the resulting beta-alumina solid electrolyte have high orientation. Moreover, the beta-alumina contains large crystals because crystal growth takes place while the beta-alumina formed by calcination is acting as a nucleus for crystal growth. In addition, many of the large crystals have a shape of large aspect ratio, i.e. a thin and long shape.

OBJECT AND SUMMARY OF THE INVENTION

An object of the present invention is to produce a beta-alumina solid electrolyte efficiently without calcination of the materials. Another object of the present invention is to provide a beta-alumina solid electrolyte having low electrical resistance and high strength with respect to internal water pressure.

According to the present invention, there is provided a beta-alumina solid electrolyte for use in a sodium-sulfur battery, wherein the beta-alumina crystals constituting said electrolyte have a degree of orientation toward the C axis thereof, of 0.2–0.4 and an aspect ratio of 4.0 or less.

According to the present invention, there is also provided a beta-alumina solid electrolyte for use in a sodium-sulfur battery, wherein the beta-alumina crystals constituting said electrolyte have a degree of orientation toward the C axis thereof, of 0.2–0.4 and have such a particle diameter distribution that the average particle diameter is 3 μm or less, the proportion of the particles having a particle diameter of 5 μm or less is 90% or more, and the maximum diameter is 300 μm or less.

The beta-alumina solid electrolyte of the present invention preferably has an electrical resistance of 4.0 $\Omega$.cm or less, a burst strength to internal pressure of 150 MPa or more, and a density of 3.20 $g/cm^3$ or more.

According to the present invention there is further provided a process for producing a beta-alumina solid electrolyte using an alumina source material, a magnesium source material and a sodium source material, which comprises using a magnesium-aluminium spinel as the magnesium source material and subjecting all materials to mixing, granulation, molding and firing to obtain a beta-alumina solid electrolyte without subjecting the materials to calcination.

In the process of the present invention, it is preferable that the molar ratio of magnesia and alumina in the magnesium-aluminum spinel is 1 or more, and further, that the sodium source material is sodium compound(s) containing at least either $NaHCO_3$ or sodium oxalate.

In the process of the present invention, it is also preferable for property improvement in electrical resistance, strength, and the like that the firing is conducted according to a heat curve comprising:

(1) a step of keeping the system temperature at a constant temperature in the range of 1,400°–1,550° C. for 1–5 hours, or a step of increasing the system temperature at a rate of 50° C./hr or less in said temperature range, (2) a step of keeping the system temperature at the maximum temperature of 1,580°–1,650° C. for 0.1–3.0 hours, and (3) a step of keeping the system temperature at a constant temperature in the range of 1,400°–1,550° C. for 1–5 hours, or a step of decreasing the system temperature at a rate of 50° C./hr or less in said temperature range.

In the present invention, the beta-alumina is a generic name for $\beta$-$Al_2O_3$ ($Na_2O.11Al_2O_3$), $\beta''$-$Al_2O_3$ ($Na_2O.5Al_2O_3$), $\beta'''$-$Al_2O_3$, and the like and refers particularly to a beta-alumina containing $\beta''$-$Al_2O_3$ in an amount of 95% or more.

DETAILED DESCRIPTION OF THE INVENTION

Figure 1:
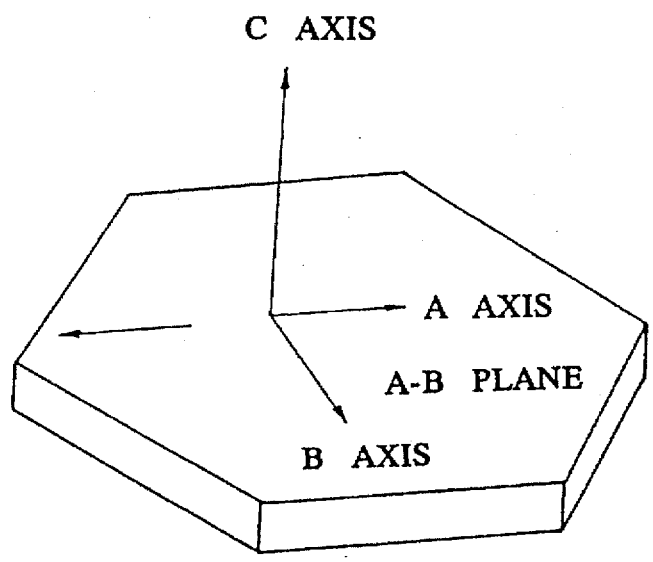
FIG. 1 is a schematic view of a single crystal of the beta-alumina solid electrolyte of the present invention.

The present invention is hereinafter described in detail.

A main feature of the present invention is that in the production of a beta-alumina solid electrolyte, magnesium-aluminum spinel is used as a magnesium source material which is a stabilizer for beta-alumina, in place of MgO, and the like used in the conventional process. All materials including magnesium-aluminum spinel are mixed; the mixture is granulated without being calcined, followed by molding and firing; thereby, a beta-alumina having excellent properties when used as a solid electrolyte can be obtained.

The present inventor made a study from various angles in order to shorten the conventional steps for beta-alumina production. As a result, the present inventor discovered that when magnesium-aluminum spinel is used in place of conventional MgO, as a magnesium source material, the spinel is presumed to act as a seed crystal for beta-alumina crystal formation in the firing step of beta-alumina production and the calcination of materials for beta-alumina formation becomes unnecessary.

The magnesium-aluminum spinel used as a magnesium source material has a magnesia (MgO)/alumina ($Al_2O_3$) molar ratio of preferably 1 or more (MgO-rich), more preferably 1.0–1.5. The reason is not clear but, when the molar ratio is outside the above range, the resulting beta-alumina has slightly inferior properties in electrical resistance, strength, and the like.

Further, the magnesium-aluminum spinel is preferably fine and specifically has an average particle diameter of preferably 1 μm or less, more preferably 0.5 μm or less. Furthermore, the magnesium-aluminum spinel preferably has a 90% particle diameter of 10 μm or less, preferably 5 μm or less. Moreover, the magnesium-aluminum spinel preferably has a specific surface area of 5 $m^2/g$ or more. When the magnesium-aluminum spinel has the particle diameter and specific surface area in the above ranges, the resulting beta-alumina sintered material has small crystal orientation and a small crystal aspect ratio and thus has good properties.

As the sodium compound for the sodium source material, there can be used conventionally known compounds such as $Na_2CO_3$ and the like. However, use of sodium hydrogencarbonate ($NaHCO_3$) or sodium oxalate is preferable because segregation of the sodium compound in the granulation product can be avoided and uniform dispersion can be achieved. That is, $NaHCO_3$ or sodium oxalate, having lower solubility in the solvent used (e.g. water) than $Na_2CO_3$, precipitates rapidly during drying for granulation and can be dispersed uniformly in the granulation production. Use of $NaHCO_3$ or sodium oxalate is also preferable because, when materials including $NaHCO_3$ or sodium oxalate are mixed in a slurry state, the slurry can be controlled at a pH of about 10, making it easy to select an organic binder.

$NaHCO_3$ or sodium oxalate may be used singly, or may be used as a mixture with $Na_2CO_3$.

The $NaHCO_3$ or sodium oxalate used has an average particle diameter of preferably 5 μm or less.

The alumina source material is preferably $\alpha$-$Al_2O_3$. It is preferably fine and has an average particle diameter of 1 μm or less, particularly preferably 0.5 μm or less. The $\alpha$-$Al_2O_3$ also has a specific surface area of preferably 5 $m^2/g$ or more, more preferably 10 $m^2/g$ or more. When the $\alpha$-$Al_2O_3$ has a particle diameter in the above range, the resulting beta-alumina sintered material scarcely contains large crystals and tends to be dense and have a low resistance.

The alumina source material, the magnesium source material and the sodium source material all having desired properties in particle diameter, and the like as mentioned above, are mixed in given proportions allowing for beta-alumina formation. The mixing is conducted by grinding the materials in water, whereby a slurry is prepared. Mixing as uniform as possible is preferable because it can improve sinterability in the firing step.

The slurry is granulated using a spray dryer or the like. This granulation step is conducted to make the mixing of materials uniform and improve moldability in the subsequent molding step. In the granulation step, a granulation product is produced so as to generally have an average particle diameter of 50–100 μm.

The granulation product is then molded into a desired shape.

The molding is made into a tubular shape in many cases because the beta-alumina solid electrolyte of the present invention is suitably used mainly as a diaphragm for a sodium-sulfur battery.

The molding is conducted at a pressure of 1.5 ton/$cm^2$ or more, preferably 2.0 ton/$cm^2$ or more, whereby a molded material having a density of 1.9 g/$cm^3$ or more is produced.

Then, the molded material is fired under given conditions, whereby growth of uniform crystals is accelerated and beta-alumina crystals are formed. In this case, it is preferable to set the firing conditions and firing heat curve as described below. In the present invention, since magnesium-aluminum spinel is used as a seed crystal for beta-alumina formation, the volume expansion associated with the phase transition from $\alpha$-$Al_2O_3$ to beta-alumina poses no big problem. However, it is preferable to appropriately control the heat curve for firing in order to obtain a beta-alumina solid electrolyte of uniform quality, large strength and low electrical resistance.

Hence, it is important to set the maximum firing temperature at 1,580°–1,650° C. in order to obtain a beta-alumina containing a high proportion of $\beta''$-$Al_2O_3$ having good properties. Specifically, the heat curve preferably comprises at least three steps.

(1) a step of keeping the system temperature at a constant temperature in the range of 1,400°–1,550° C. (in this temperature range, $\beta$-$Al_2O_3$ changes to $\beta''$-$Al_2O_3$) for 1–5 hours, or a step of increasing the system temperature at a rate of 50° C./hr or less in said temperature range, (2) a step of keeping the system temperature at the maximum temperature of 1,580°–1,650° C. for 0.1–3.0 hours, and (3) a step of keeping the system temperature at a constant temperature in the range of 1,400°–1,550° C. for 1–5 hours, or a step of decreasing the system temperature at a rate of 50° C./hr or less in said temperature range.

The above heat curve is effective because it can increase the $\beta''$-$Al_2O_3$ content in beta-alumina to 95% or more.

The beta-alumina solid electrolyte obtained by the process of the present invention has unique inherent characteristics in that the beta-alumina crystals constituting the solid electrolyte have small orientation and a small aspect ratio.

Specifically, the beta-alumina crystals constituting the solid electrolyte have a degree of crystal orientation toward the C axis thereof, of 0.2–0.4, preferably 0.25–0.35 and an aspect ratio of 4.0 or less, preferably 3.0 or less.

Beta-alumina crystals have a hexagonal crystal structure and, in each single crystal as seen in FIG. 1 showing a schematic view of beta-alumina solid electrolyte single crystal, have an Na-ion-conductive plane in the plane formed by the A axis and the B axis, i.e. the A-B plane, and show no conductivity toward a direction perpendicular to the A-B plane, i.e. the C axis direction. Further, the crystals, having a cleaving property along the A-B plane, have low tensile strength in the C axis direction. Hence, the beta-alumina crystals preferably have low orientation. In the conventional process for production of beta-alumina crystals (said process includes a step of calcination of materials), however, it has been difficult to produce beta-alumina crystals of low orientation.

Incidentally, the degree of crystal orientation toward the C axis thereof, of beta-alumina solid electrolyte which is a polycrystal, was measured as follows.

Figure 2:
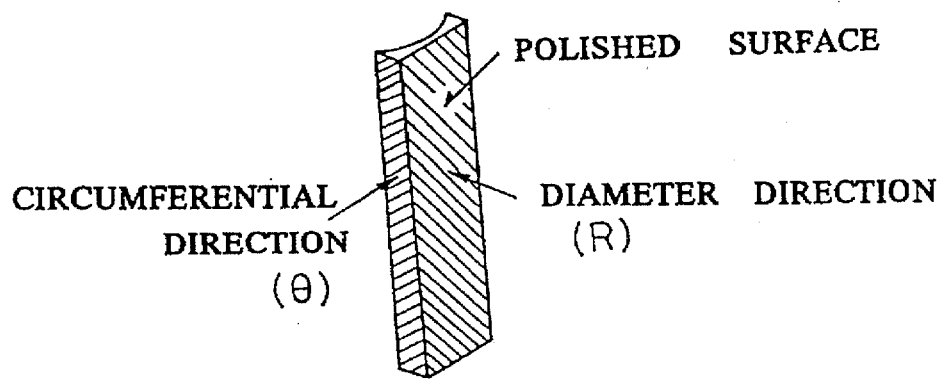
FIG. 2 is a perspective view showing a test piece obtained by cutting the beta-alumina sintered material of the present invention in the lengthwise direction.

The beta-alumina sintered material obtained by the given production process was cut to obtain a test piece of 1 mm in width and 40 mm in length, shown in FIG. 2. The test piece was polished at the outer surface to remove the unevennesses of the surface. The outer surface of the polished test piece was subjected to analysis by an X-ray analyzer to obtain the diffraction pattern of the surface, and the relative amounts of various crystal faces, each directing toward the diameter direction of a beta-alumina tube, were calculated.

In the specific measurement, an X-ray analyzer of the goniometer type was used. Using characteristic X-rays, a tube voltage of 35 KV and a tube current of 20 mA, a diffraction pattern was recorded on a chart. For various crystal faces each having a given angle (0°, 33.3°, 60° or 90°) to the C axis of the beta-alumina crystals, there were measured respective peak heights, and the proportion of each crystal face was expressed as a relative value. The relative values of beta-alumina crystal faces are shown in Table 1.

TABLE 1

| Angle between C axis and crystal face (°) | Crystal face | Diffraction angle 2θ (°) | Peak height measured (mm) | Orientation degree of crystal face (relative value) |
|---|---|---|---|---|
| 0.0 | 006 | 15.0–16.0 | $H_1$ | $H_1/(H_1 + H_2 + H_3 + H_4)$ |
| 33.3 | 101 | 32.0–32.5 | $H_2$ | $H_2/(H_1 + H_2 + H_3 + H_4)$ |
| 60.0 | 104 | 20.0–21.0 | $H_3$ | $H_3/(H_1 + H_2 + H_3 + H_4)$ |
| 90.0 | 110 | 31.5–32.0 | $H_4$ | $H_4/(H_1 + H_2 + H_3 + H_4)$ |

In the present invention, "degree of crystal orientation toward C axis" refers to the relative value of the peak height ($H_1$ of Table 1), when the angle between C axis and crystal face is 0°, that is, the crystal face agrees with the C axis, to total peak height ($H_1+H_2+H_3+H_4$), i.e. $H_1/(H_1+H_2+H_3+H_4)$. When the degree of crystal orientation toward C axis is high, the non-conductive face of the beta-alumina crystals is directed to the Na-ion-conductive direction of the beta-alumina tube and, as a result, the beta-alumina tube has a high resistance.

In the present invention, the aspect ratio of beta-alumina crystals is measured as follows.

The beta-alumina sintered material is cut to obtain a small test piece. The test piece is polished and etched at a section. The resulting section is observed using a scanning type electron microscope and photographed at a magnification allowing for the observation of individual particles. Using the photograph, the major axis and minor axis of each individual particle were measured and the average of their ratios was taken as the aspect ratio of the sintered material.

When the degree of crystal orientation toward C axis, of the beta-alumina crystals is smaller than 0.2, the crystals have a small electrical resistance but small mechanical strength (e.g. small burst strength to internal pressure) and is unsuitable for use as a diaphragm for a sodium-sulfur battery. When the degree of crystal orientation is larger than 0.4, the crystals have large mechanical strength but an electrical resistance thereof is too high.

When the aspect ratio of beta-alumina crystals deviates from the above range, the beta-alumina crystals are too thin and long, making it impossible to obtain a beta-alumina solid electrolyte having excellent properties (e.g. low electrical resistance, high strength, and the like) in good balance.

Further in the present invention, the beta-alumina crystals constituting the beta-alumina solid electrolyte have such a particle diameter distribution that the average particle diameter is 3 μm or less, the proportion of the particles having a particle diameter of 5 μm or less is 90% or more, and the maximum particle diameter is 300 μm or less, preferably 200 μm or less. In the beta-alumina crystals, the size of large crystals present therein is small and their amount is also small.

As described above, the beta-alumina solid electrolyte of the present invention has a particular crystal structure and shows excellent properties when used as a diaphragm for a sodium-sulfur battery.

Specifically, the present beta-alumina solid electrolyte has an electrical resistance of 4.0 Ω.cm or less, preferably 3.5 Ω.cm or less, a burst strength to internal pressure of 150 MPa or more, preferably 180 MPa or more, and a density of 3.20 g/cm$^3$ or more, preferably 3.22 g/cm$^3$ or more.

The present invention is hereinafter described in more detail by way of Examples. However, the present invention is not restricted to these Examples.

EXAMPLE 1 AND COMPARATIVE EXAMPLE 1

The following three raw materials were weighed: (i) an α-$Al_2O_3$ powder having an average particle diameter of 1.5 μm and a specific surface area of 3.5 m$^2$/g as measured by BET adsorption method, (ii) $Na_2CO_3$ having an average particle diameter of 1 μm, and (iii) a magnesium-aluminum spinel having an average particle diameter, a 90% particle diameter and a MgO/$Al_2O_3$ molar ratio all shown in Table 2, in proportions allowing for beta-alumina formation, i.e. proportions of 71% ($Al_2O_3$), 14% (spinel) and 15% ($Na_2CO_3$). The raw materials were uniformly mixed in water using a ball mill to prepare a slurry.

The slurry was granulated into grains having an average particle diameter of 60 μm using a spray dryer. The grains were molded into a tubular molded material having a 25 mm diameter, a 230 mm length and a 1.3 mm thickness, at a pressure of 2 ton/cm$^2$ using an isostatic press.

The molded material was placed in an MgO-made sagger and fired at the maximum temperature of 1,600° C. for 30 minutes to obtain a beta-alumina sintered material. The crystal structure and properties of the beta-alumina sintered material are shown in Table 2.

For comparison, beta-alumina sintered materials (sample Nos. 1–3 of Comparative Example 1) were obtained under the same conditions as in Example 1 except that the mixture of raw materials was calcined at 1250° C. for 120 minutes and then ground. Further, beta-alumina sintered materials (sample Nos. 4–6 of Comparative Example 1) were obtained under the same conditions as in Example 1 except that no magnesium-aluminum spinel was used. The crystal structures and properties of these beta-alumina sintered materials (sample Nos. 1–6 of Comparative Example 1) are shown in Table 2.

In Table 2, electrical resistance and strength to internal water pressure were measured as follows.

Test Method for Electrical Resistance

Figure 3:
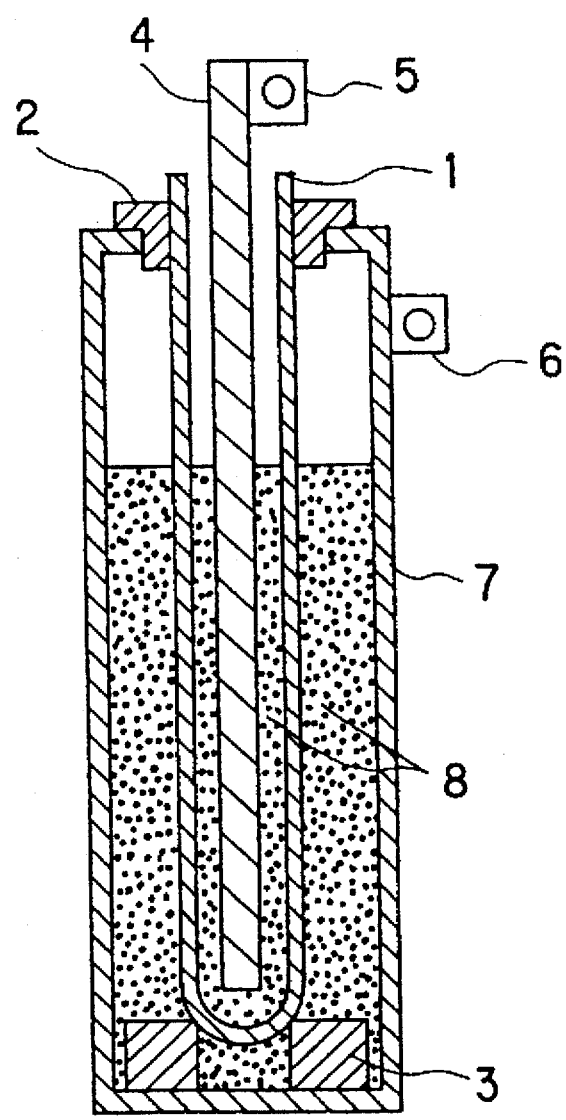
FIG. 3 is a view showing an example of the constitution of the Na/Na conductivity tester for measurement of electrical resistance, used in the present invention.

Electrical resistance was obtained as a value at 350° C. using an Na/Na conductivity tester shown in FIG. 3. In FIG.

3, the Na/Na conductivity tester was constituted by a tubular beta-alumina sintered material (a beta-alumina tube) 1, insulating supports 2 and 3, a stainless steel electrode 4 and electrode terminals 5 and 6. By feeding molten sodium 8 of 350° C. into a container 7 and the beta-alumina tube 1 and passing a given electricity between the terminals 5 and 6, the electrical resistance of the beta-alumina tube to be measured was determined as a specific resistance.

Test Method for Burst Strength to Internal Pressure

A water pressure was applied to the inner wall of a tubular beta-alumina sintered material (a beta-alumina tube) via a rubber tube. The burst strength with respect to internal pressure of the tube was determined from (i) the water pressure when the beta-alumina tube broke and (ii) the dimension of the tube.

EXAMPLE 2

In order to confirm the effect of addition of sodium compound, beta-alumina sintered materials were obtained under the same steps and conditions as in Example 1 except that various sodium compounds as shown in Table 3 were used. The crystal structures and properties of the beta-alumina sintered materials obtained are shown in Table 3.

TABLE 2

| | | Production conditions and raw materials | | | | Electrical | Burst strength to internal | Degree of | | Average particle | Proportion of particles | Maximum particle |
| | Sample No. | Spinel | Molar ratio *1 | D50 *2 | D90 *3 | Density (g/cm³) | regisstance (Ω cm) | pressure (MPa) | orienta-tion | Aspect ratio | diameter (μm) | of 5 μm or less (%) | diameter (μm) |
|---|---|---|---|---|---|---|---|---|---|---|---|---|---|
| Example 1 | 1 | A | 0.8 | 1.0 | 5.0 | 3.20 | 3.5 | 180 | 0.35 | 2.4 | 1.8 | 95 | 120 |
| | 2 | B | 1.0 | 1.0 | 5.0 | 3.22 | 3.4 | 180 | 0.34 | 2.5 | 1.8 | 96 | 130 |
| | 3 | C | 1.1 | 1.0 | 5.0 | 3.23 | 3.4 | 180 | 0.34 | 2.3 | 1.9 | 96 | 150 |
| | 4 | D | 1.2 | 1.0 | 5.0 | 3.23 | 3.4 | 190 | 0.35 | 2.2 | 1.7 | 95 | 120 |
| | 5 | E | 1.4 | 1.0 | 5.0 | 3.22 | 3.5 | 190 | 0.33 | 2.4 | 1.6 | 96 | 130 |
| | 6 | F | 1.5 | 1.0 | 5.0 | 3.20 | 3.5 | 180 | 0.35 | 2.3 | 1.5 | 95 | 100 |
| | 7 | G | 1.1 | 0.5 | 1.0 | 3.25 | 3.1 | 190 | 0.24 | 1.6 | 2.3 | 98 | 90 |
| | 8 | H | 1.1 | 0.5 | 2.0 | 3.25 | 3.1 | 200 | 0.27 | 1.8 | 2.3 | 97 | 80 |
| | 9 | I | 1.1 | 0.8 | 4.0 | 3.23 | 3.3 | 190 | 0.31 | 2.0 | 2.1 | 97 | 100 |
| | 3 | C | 1.1 | 1.0 | 5.0 | 3.23 | 3.4 | 180 | 0.34 | 2.3 | 1.9 | 96 | 150 |
| | 10 | J | 1.1 | 1.0 | 8.0 | 3.22 | 3.4 | 180 | 0.34 | 2.5 | 2.2 | 94 | 120 |
| | 11 | K | 1.1 | 5.0 | 10.0 | 3.20 | 3.5 | 180 | 0.37 | 2.7 | 2.5 | 91 | 160 |
| | 12 | L | 1.1 | 5.0 | 15.0 | 3.20 | 3.6 | 180 | 0.38 | 2.8 | 2.8 | 92 | 180 |
| Compara-tive Ex-ample 1 | 1 | Calcination conducted. Beta-Alumina particled diameter 1.0 μm | | | | 3.23 | 4.5 | 160 | 0.38 | 4.2 | 3.5 | 87 | 180 |
| | 2 | | | 2.0 μm | | 3.21 | 5.0 | 120 | 0.43 | 4.5 | 4.2 | 62 | 350 |
| | 3 | | | 3.0 μm | | 3.15 | 6.4 | 100 | 0.48 | 4.5 | 5.3 | 45 | 400 |
| | 4 | No spinel used | | | | 3.05 | 6.2 | 140 | | | | | |
| | 5 | No spinel used MgO added. | | | | 3.10 | 4.8 | 130 | | | | | |
| | 6 | No spinel used MgCO₃ added. | | | | 3.08 | 5.5 | 120 | | | | | |

*1 Spinel composition ($MgO/Al_2O_3$ moler ratio)
*2 Average particle diameter (μm)
*3 90% Particle diameter (μm)

TABLE 3

| | Sample No. | Kids of spinel and sodium compound(s) |
|---|---|---|
| Example 2 | 3 | Spinel = C  $Na_2CO_3$ |
| | 13 | C  $NaHCO_3/Na_2CO_3$ (molar ratio: 20/80) |
| | 14 | C  $NaHCO_3/Na_2CO_3$ (molar ratio: 40/60) |
| | 15 | C  $NaHCO_3/Na_2CO_3$ (molar ratio: 60/40) |
| | 16 | C  $NaHCO_3/Na_2CO_3$ (molar ratio: 80/20) |
| | 17 | C  $NaHCO_3$ |
| | 18 | C  Sodium oxalate |

TABLE 3-continued

| | Sample No. | Density (g/cm³) | Electrical resistance (Ω cm) | Burst strength to internal pressure (MPa) | Degree of orientation | Aspect ratio | Average particle diameter (μm) | Preparation of particles of 5 μm or less (%) | Maximum particle diameter (μm) |
|---|---|---|---|---|---|---|---|---|---|
| Example 2 | 3 | 3.23 | 3.4 | 180 | 0.34 | 2.3 | 1.9 | 96 | 150 |
| | 13 | 3.25 | 3.1 | 220 | 0.33 | 2.0 | 2.2 | 94 | 90 |
| | 14 | 3.24 | 3.1 | 230 | 0.33 | 2.0 | 2.1 | 95 | 80 |
| | 15 | 3.25 | 3.0 | 220 | 0.32 | 2.2 | 2.3 | 92 | 100 |
| | 16 | 3.24 | 3.1 | 210 | o.34 | 2.1 | 2.4 | 93 | 90 |
| | 17 | 3.24 | 3.2 | 200 | 0.33 | 2.3 | 2.0 | 92 | 110 |
| | 18 | 3.24 | 3.1 | 210 | 0.35 | 2.4 | 2.1 | 92 | 150 |

EXAMPLE 3

In order to confirm the effect of alumina material, beta-alumina sintered materials were obtained under the same steps and conditions as in Example 1 except that the average particle diameter and BET specific surface area of $\alpha$-$Al_2O_3$ material were varied as shown in Table 4. The crystal structures and properties of the beta-alumina sintered materials obtained are shown in Table 4.

TABLE 4

In order to confirm the effect of firing conditions, beta-alumina sintered materials were obtained under the same steps and conditions as in Example 1 except that the heat curve for firing was varied as shown in Table 5. The crystal structures and properties of the beta-alumina sintered materials obtained are shown in Table 5.

TABLE 4

| | Sample No. | Kids of spinel and material alumina | | D50*¹ | BET*² |
|---|---|---|---|---|---|
| Example 3 | 3 | Spinel = C | Alumina = A | 1.5 | 3.5 |
| | 19 | C | B | 0.5 | 15.5 |
| | 20 | C | C | 0.5 | 10.0 |
| | 21 | C | D | 0.8 | 10.0 |
| | 22 | C | E | 0.8 | 5.0 |
| | 23 | C | F | 1.0 | 5.0 |
| | 24 | C | G | 2.0 | 3.0 |

| | Sample No. | Density (g/cm³) | Electrical resistance (Ω cm) | Burst strength to internal pressure (MPa) | Degree of orientation | Aspect ratio | Average particle diameter (μm) | Preparation of particles of 5 μm or less (%) | Maximum particle diameter (μm) |
|---|---|---|---|---|---|---|---|---|---|
| Example 3 | 3 | 3.23 | 3.4 | 180 | 0.34 | 2.3 | 1.9 | 96 | 150 |
| | 19 | 3.25 | 3.1 | 190 | 0.23 | 1.5 | 2.2 | 97 | 80 |
| | 20 | 3.24 | 3.2 | 200 | 0.23 | 1.4 | 2.1 | 98 | 70 |
| | 21 | 3.24 | 3.2 | 180 | 0.25 | 1.7 | 2.3 | 96 | 100 |
| | 22 | 3.24 | 3.2 | 180 | 0.24 | 1.9 | 2.1 | 95 | 90 |
| | 23 | 3.24 | 3.2 | 170 | 0.31 | 2.0 | 2.1 | 95 | 110 |
| | 24 | 3.20 | 3.4 | 170 | 0.37 | 2.6 | 2.8 | 91 | 150 |

*¹Average particle diameter (μm)
*²Specific surface area (m²/g) as measured by BET adsorption method.

TABLE 5

| | Sample No. | Heat curve for firing | | |
|---|---|---|---|---|
| | | 1st step | 2nd step (max. temp.) | 3rd steps |
| Example 4 | 3 | — | 1,600° C. × 0.5 hr | |
| | 25 | 1,450° C. × 1 hr | 1,600° C. × 0.5 hr | 1,450° C. × 1 hr |
| | 26 | 1,500° C. × 1 hr | 1,600° C. × 0.5 hr | 1,500° C. × 1 hr |

TABLE 5-continued

| | Sample No. | Density (g/cm$^3$) | Electrical resistance (Ω cm) | Burst strength to internal pressure (MPa) | Degree of orientation | Aspect ratio | Average particle diameter (μm) | Preparation of particles of 5 μm or less (%) | Maximum particle diameter (μm) |
|---|---|---|---|---|---|---|---|---|---|
| Example 4 | 3 | 3.23 | 3.4 | 180 | 0.34 | 2.3 | 1.9 | 96 | 150 |
| | 25 | 3.25 | 3.0 | 220 | 0.33 | 2.0 | 2.3 | 97 | 60 |
| | 26 | 3.24 | 3.1 | 210 | 0.34 | 2.1 | 2.2 | 97 | 80 |

As is clear from the above, the beta-alumina sintered materials produced in the scope of the present invention have good properties in electrical resistance, strength to internal water pressure, and the like, and the beta-alumina sintered materials produced under more preferable conditions have better properties in electrical resistance, strength to internal water pressure, and the like.

As described above, in the present invention, since the magnesium source material is fed in the form of magnesium-aluminum spinel, a beta-alumina solid electrolyte can efficiently be produced without subjecting raw materials to calcination.

Further, the beta-alumina solid electrolyte obtained by the present process, having a unique crystal structure in that the beta-alumina crystals constituting the solid electrolyte have small orientation and a small aspect ratio, has a low electrical resistance and a high strength to internal water pressure and is excellent as a diaphragm for a sodium-sulfur battery.

What is claimed is:

1. A process for producing a beta-alumina solid electrolyte using an alumina source material, a magnesium source material and a sodium source material, which comprises using a magnesium-aluminum spinel as the magnesium source material and subjecting all materials to mixing, granulation, molding and firing to obtain a beta-alumina solid electrolyte without subjecting the materials to calcination.

2. A process according to claim 1, wherein the molar ratio of magnesia (MgO) and alumina ($Al_2O_3$) in the magnesium-aluminum spinel is 1 or more.

3. A process according to claim 1, wherein the sodium source material is sodium compound(s) containing at least either of $NaHCO_3$ and sodium oxalate.

4. A process according to claim 1, wherein the firing is conducted according to a heat curve comprising:

(1) a step of keeping the system temperature at a constant temperature in the range of 1,400°–1,550° C. for 1–5 hours, or a step of increasing the system temperature at a rate of 50° C./hr or less in said temperature range, (2) a step of keeping the system temperature at the maximum temperature of 1,580°–1,650° C. for 0.1–3.0 hours, and (3) a step of keeping the system temperature at a constant temperature in the range of 1,400°–1,550° C. for 1–5 hours, or a step of decreasing the system temperature at a rate of 50° C./hr or less in said temperature range.

* * * * *